US012668313B2

(12) United States Patent (10) Patent No.: US 12,668,313 B2
Maeda (45) Date of Patent: Jun. 30, 2026

(54) VEHICLE-BODY FRONT STRUCTURE

(71) Applicant: SUBARU CORPORATION, Tokyo (JP)

(72) Inventor: Akihiro Maeda, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 350 days.

(21) Appl. No.: 18/520,055

(22) Filed: Nov. 27, 2023

(65) Prior Publication Data

US 2024/0208582 A1 Jun. 27, 2024

(30) Foreign Application Priority Data

Dec. 21, 2022 (JP) ................................. 2022-203814

(51) Int. Cl.
*B62D 25/08* (2006.01)
*B62D 25/04* (2006.01)
(Continued)

(52) U.S. Cl.
CPC ........... *B62D 25/081* (2013.01); *B62D 25/04* (2013.01); *B62D 25/14* (2013.01);
(Continued)

(58) Field of Classification Search
CPC .... B62D 25/2045; B62D 25/04; B62D 25/08; B62D 25/081; B62D 25/082; B62D 25/14;
(Continued)

(56) References Cited

U.S. PATENT DOCUMENTS 3,321,235 A * 5/1967 Muller ............... B62D 25/2045
296/204
2010/0140978 A1* 6/2010 Utsunomiya ........ B23K 26/244
219/121.64
(Continued)

FOREIGN PATENT DOCUMENTS

JP 3707707 B2 * 10/2005
JP 2016-64732 A 4/2016

OTHER PUBLICATIONS

Translation JP 3707707 (Year: 2005).*

*Primary Examiner* — Amy R Weisberg
*Assistant Examiner* — Denise L. Esquivel
(74) *Attorney, Agent, or Firm* — McGinn IP Law Group, PLLC

(57) ABSTRACT
A vehicle-body front structure includes: a toe board including an upper toe board and a lower toe board joined to each other with a vehicle lower-side edge of the upper toe board overlapping a vehicle upper-side edge of the lower toe board; main frames provided on opposite sides of the vehicle-body front part in a vehicle width direction and extending in a vehicle front-rear direction; and front pillars extending in a vehicle up-down direction on opposite outer sides of the toe board in the vehicle width direction. The toe board has a closed cross section at a position where the upper and lower toe boards are overlapped. The closed cross section includes opposite ends joined to the front pillars in the vehicle width direction. The main frames are joined to the toe board at positions overlapping the closed cross section in a vehicle front view.

19 Claims, 7 Drawing Sheets

(51) Int. Cl.

| | | |
|---|---|---|
| B62D 25/14 | (2006.01) | |
| B62D 25/20 | (2006.01) | |
| B62D 27/02 | (2006.01) | |
| *B62D 21/15* | (2006.01) | |

(52) U.S. Cl.
CPC ....... B62D 25/2045 (2013.01); B62D 27/023 (2013.01); *B62D 21/152* (2013.01)

(58) Field of Classification Search
CPC . B62D 25/147; B62D 25/2018; B62D 21/152
USPC ........... 296/203.01, 203.02, 203.03, 193.06, 296/193.07, 193.09, 187.09, 187.1, 296/187.08, 192, 193.02, 70
See application file for complete search history.

(56) References Cited

U.S. PATENT DOCUMENTS

2023/0339552 A1* 10/2023 Jeong ................... B62D 27/065
2024/0166272 A1* 5/2024 Terada ............... B62D 25/2018

* cited by examiner

VEHICLE-BODY FRONT STRUCTURE

CROSS-REFERENCE TO RELATED APPLICATIONS

The present application claims priority from Japanese Patent Application No. 2022-203814 filed on Dec. 21, 2022, the entire contents of which are hereby incorporated by reference.

BACKGROUND

The disclosure relates to a vehicle-body front structure.

In general, in a frontal collision of a vehicle, it is effective to prevent a deformation of a cabin that is a boarding space for an occupant in order to reduce an influence on the occupant, and various measures to prevent the deformation of the cabin are taken.

As one of these measures, in recent years, a structure has been adopted in which collision energy is absorbed in a structure body provided in a vehicle-body front part in front of the cabin.

Additionally, a structure has also been introduced in which a toe board (dash panel) is disposed between the cabin and the vehicle-body front part to separate the cabin from the vehicle-body front part and rigidity of the vehicle-body front part is improved, thereby reducing vibrations and noise generated in association with travel of the vehicle and preventing the deformation of the cabin at the time of the collision of the vehicle.

For example, according to Japanese Unexamined Patent Application Publication (JP-A) No. 2016-64732, an upper dash panel (upper toe board) and a lower dash panel (lower toe board) constitute a closed cross section structure having a closed cross section in a cross-sectional view from a vehicle width direction and extending in the vehicle width direction, and rigidity of the entire dash panel (toe board) is secured. Additionally, a first reinforcing bead provided on the dash panel can reduce vehicle front-rear direction vibrations generated in the dash panel. Furthermore, a technique is disclosed in which one end of the first reinforcing bead is coupled to the closed cross section structure, and thus the one end of the first reinforcing bead is supported by the closed cross section structure (see, for example, JP-A No. 2016-64732).

SUMMARY

An aspect of the disclosure provides a vehicle-body front structure. The vehicle-body front structure includes a toe board, main frames, and front pillars. The toe board is interposed between a vehicle-body front part and a vehicle interior and includes an upper toe board disposed on a vehicle upper side and a lower toe board disposed on a vehicle lower side, the upper toe board and the lower toe board being joined to each other with a vehicle lower-side edge of the upper toe board overlapping a vehicle upper-side edge of the lower toe board. The main frames are provided on sides of the vehicle-body front part in a vehicle width direction of the vehicle and extend in a vehicle front-rear direction of the vehicle. The front pillars extend in a vehicle up-down direction of the vehicle on opposite outer sides of the toe board in the vehicle width direction. The toe board has a closed cross section at a position where the upper toe board and the lower toe board are overlapped with each other. The closed cross section has an area larger than a cross-sectional area of a welding joint between each of the main frames and the toe board, protrudes in the vehicle front-rear direction, and extends toward the opposite sides. The closed cross section includes opposite ends in the vehicle width direction that are joined to the front pillars. The main frames are joined to the toe board at positions overlapping the closed cross section in a vehicle front view of the vehicle.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

Figure 1:
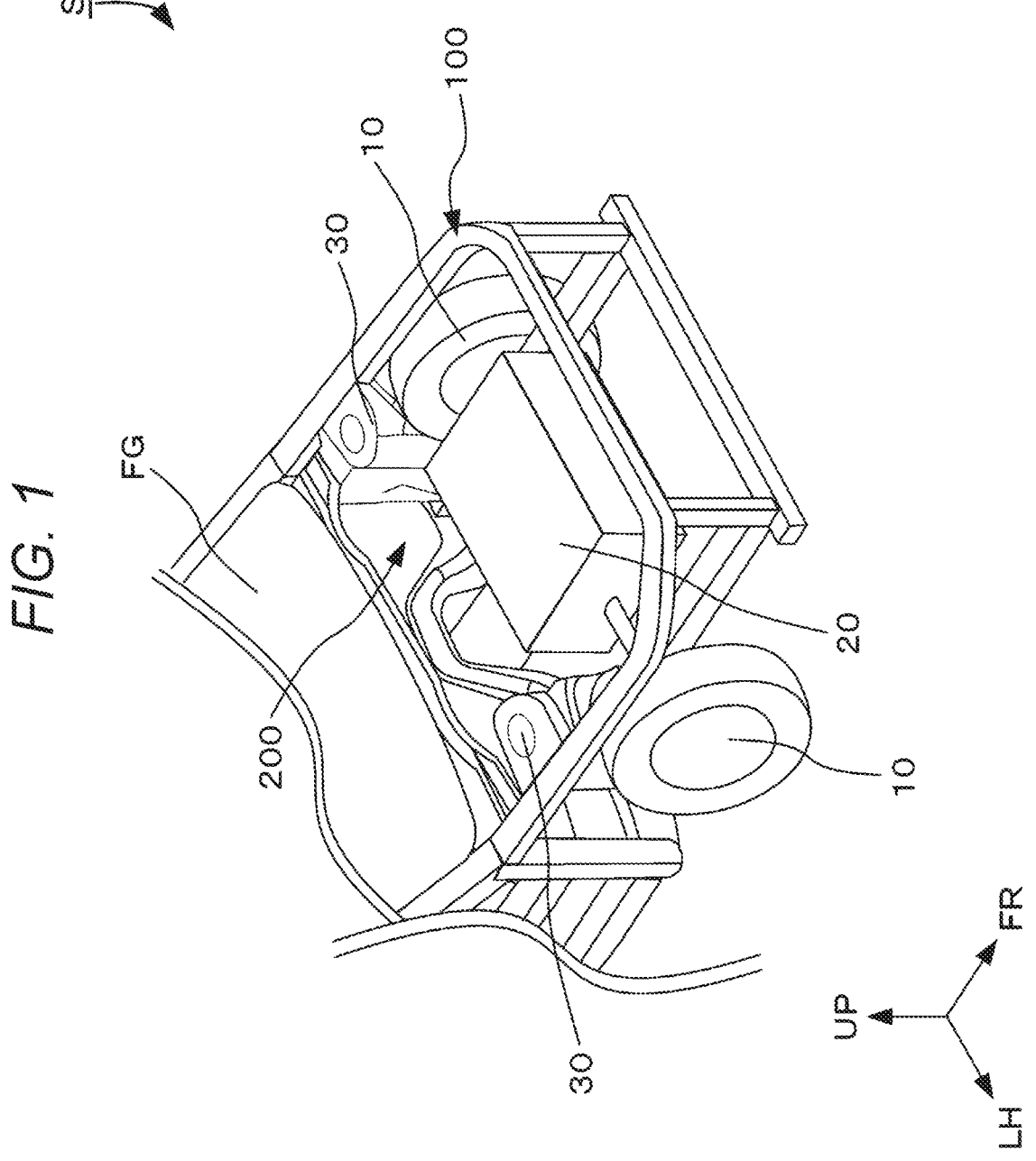
FIG. 1 is a top perspective view of a vehicle-body front part according to an embodiment of the disclosure.

The technique described in JP-A No. 2016-64732 has a problem that the closed cross section as a dash cross member provided in the toe board may not serve against the deformation of the cabin when collision energy is transmitted from a vehicle front surface, because a front side cross member constituting a framework of the vehicle-body front part is coupled to front pillars via a torque box and the toe board is located between the front pillars. Additionally, the technique described in JP-A No. 2016-64732 has a problem that provision of the first reinforcing bead results in an increase in weight.

It is desirable to provide a vehicle-body front structure that reduces weight of a vehicle-body front part while maintaining rigidity of the vehicle-body front part upon occurrence of a vehicle front-side collision.

Hereinafter, with reference to FIGS. 1 to 7, a description will be given of a vehicle V to which a vehicle-body front structure S according to the present embodiment is applied. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. Note that, arrow FR, arrow UP, and arrow LH, which are illustrated as appropriate in the drawings, point to a front side (front), an upper side in a front view, and a left side in a front view, respectively, of the vehicle illustrated in FIG. 1. Additionally, in the following description, unless otherwise specified, an up-down direction, a front-rear direction, and a left-right direction refer to an up-down direction in a front view, a front-rear direction in a front view, and a left-right direction in a front view, respectively.

Embodiment

With reference to FIGS. 1 to 6, a description will be given of a configuration of the vehicle-body front structure S, according to the present embodiment, included in the vehicle V.

Configuration of Vehicle V

The vehicle V is, for example, a vehicle including, as a drive source, an internal combustion engine or a motor. Note that, the vehicle V may be, for example, a hybrid vehicle including, as drive sources, an internal combustion engine and the motor.

Configuration of Vehicle-Body Front Structure S

The vehicle-body front structure S has a bilaterally symmetrical configuration in a vehicle width direction.

As illustrated in FIG. 1, the vehicle-body front structure S includes front wheels 10, a power unit 20, strut towers 30, a front frame 100, and a toe board 200. A windshield FG is disposed on a vehicle upper side of the toe board 200.

The power unit 20 is a drive apparatus including a motor, a transmission, a clutch, a drive shaft, and the like (which are not illustrated) that drive the front wheels 10. The power unit 20 is mounted on and fixed to the front frame 100 while being surrounded by the front frame 100.

The strut towers 30 are each a vehicle-body-side support to which a suspension is to be attached, and are provided at the vehicle-widthwise opposite sides on the vehicle front side of the toe board 200 to be described later. Each of the strut towers 30 is a framework having a slant from an upper outer side in the vehicle width direction toward a vehicle lower inner side, and is formed of a metal or the like having high rigidity. The strut tower 30 is joined, on its vehicle upper outer side, to the front frame 100.

Front Frame 100

The front frame 100 is a framework for maintaining rigidity of a vehicle-body front part FS, and is disposed around the periphery of the vehicle-body front part FS in the vehicle-body front structure S. In the front frame 100, steel materials each formed of a member such as a highly rigid metal and having a closed cross section are provided in each of a vehicle up-down direction and a vehicle front-rear direction, and the steel materials are joined to each other by welding or the like.

Figure 2:
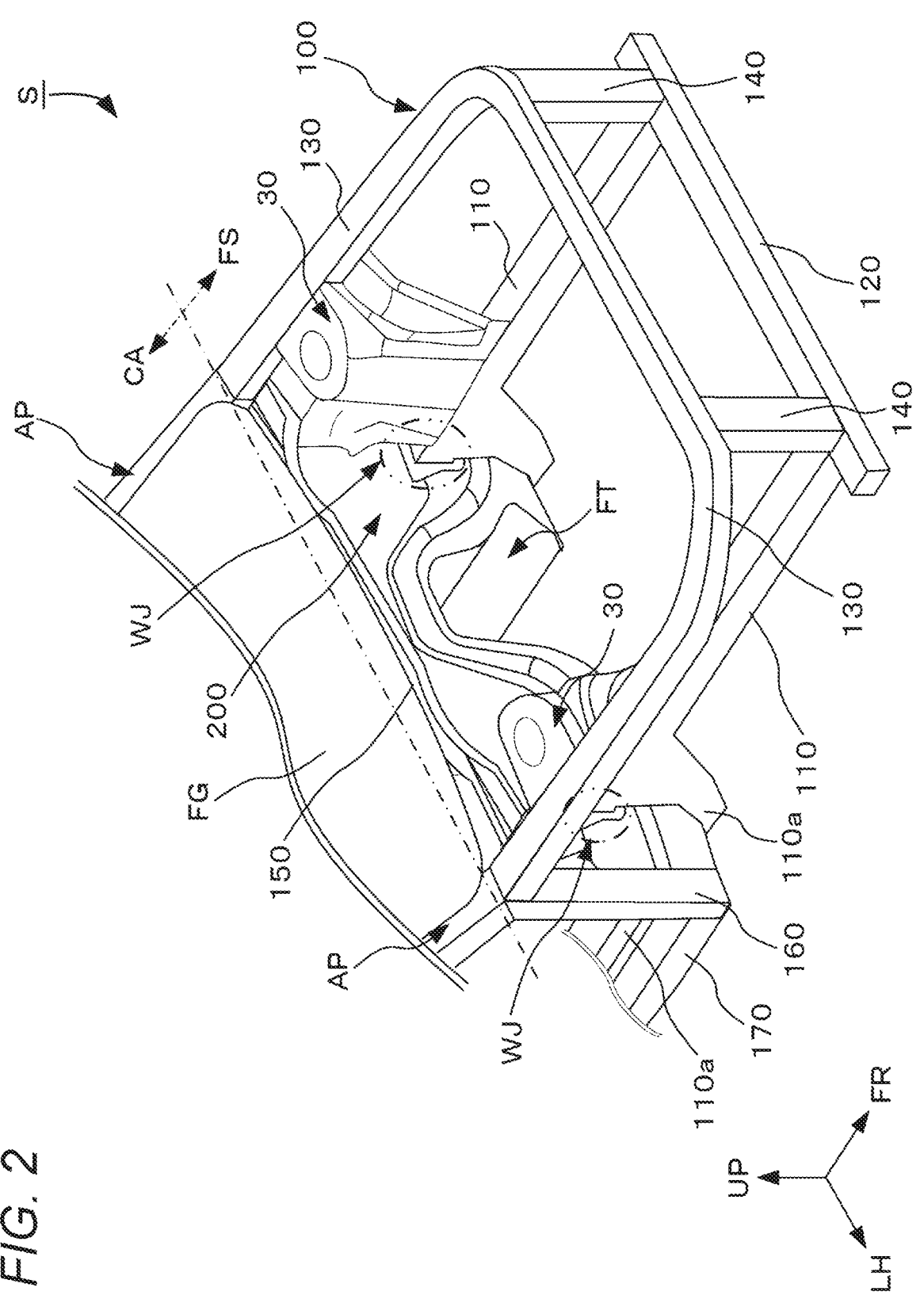
FIG. 2 is a top perspective view of the vehicle-body front part illustrated in FIG. 1 from which front wheels and a power unit are removed.

As illustrated in FIG. 2, the front frame 100 includes main frames 110, a bumper beam 120, an upper frame 130, auxiliary beams 140, front pillars 160, a bulkhead front 150, and a toe board 200.

The main frames 110 are formed of a metal or the like having high rigidity, each have a substantially rectangular closed cross-sectional shape, and are disposed to extend in the vehicle front-rear direction on vehicle-widthwise opposite sides of the vehicle-body front part FS. The bumper beam 120 extending in the vehicle width direction is joined, by welding or the like, to vehicle front-side ends of the main frames 110 disposed on the vehicle-widthwise opposite sides. The toe board 200 to be described later is joined, at welding joints WJ, to vehicle rear-side ends of the main frames 110 by welding or the like. Additionally, vehicle lower-side parts of the strut towers 30 are joined, on the vehicle front side of the toe board 200, to vehicle rear-side parts of the main frames 110. Furthermore, each of the main frames 110 is bent to the vehicle lower side of the toe board 200 and further extends toward the vehicle rear side, thereby forming a main frame rear portion 110*a*.

The upper frame 130 is formed of a metal or the like having high rigidity, has a substantially rectangular closed cross-sectional shape, and is disposed on the vehicle upper side of the vehicle-body front part FS so as to surround the periphery of the vehicle-body front part FS. The auxiliary beams 140 extending toward the vehicle lower side are joined, on a vehicle lower surface side of the upper frame 130, to a vehicle front-side part of the upper frame 130. The auxiliary beams 140 each provide firm joining between the bumper beam 120 disposed on the vehicle lower side thereof and the upper frame 130. The strut towers 30 are each joined to a vehicle rear-side part of the upper frame 130. The strut towers 30 each provide firm joining between the upper frame 130 and the main frame 110 disposed on the vehicle lower side.

The bulkhead front 150 extends in the vehicle width direction on the vehicle upper front side of the toe board 200, and is joined to the toe board 200 by welding or the like. The bulkhead front 150 is formed of a member such as a steel plate, and has a squared U shape with a vehicle lower side opened. Additionally, vehicle-widthwise opposite outer parts of the bulkhead front 150 are joined to the upper frame 130 by welding or the like.

The front pillars 160 are disposed to extend in the vehicle up-down direction on vehicle-widthwise opposite outer sides of the toe board 200. The front pillars 160 are joined to the toe board 200 by welding or the like. Vehicle rear ends of the upper frame 130 and A pillars AP are joined to vehicle upper-side ends of the front pillars 160 by welding or the like, Vehicle front ends of side sills 170 are joined, on rear sides of the front pillars 160, to vehicle lower parts of the front pillars 160 by welding or the like.

The side sills 170 are provided on lateral bottom surfaces on vehicle-widthwise opposite sides. Each of the side sills 170 is a framework extending in the vehicle front-rear direction, is formed of metal or the like having high rigidity, and has a substantially rectangular closed cross-sectional shape. The side sills 170 constitute both bottom edges of a cabin CA serving as a vehicle interior.

Toe Board 200

The toe board 200 is a partition wall that is disposed to extend in the vehicle width direction on a vehicle front side of the cabin CA serving as the vehicle interior, and that separates the cabin CA from the vehicle-body front part FS in which front-wheel suspensions and the like are accommodated. The toe board 200 is provided upright in the vehicle up-down direction on the vehicle front side of the cabin CA, and is joined to the front frame 100 by welding or the like.

Figure 3:
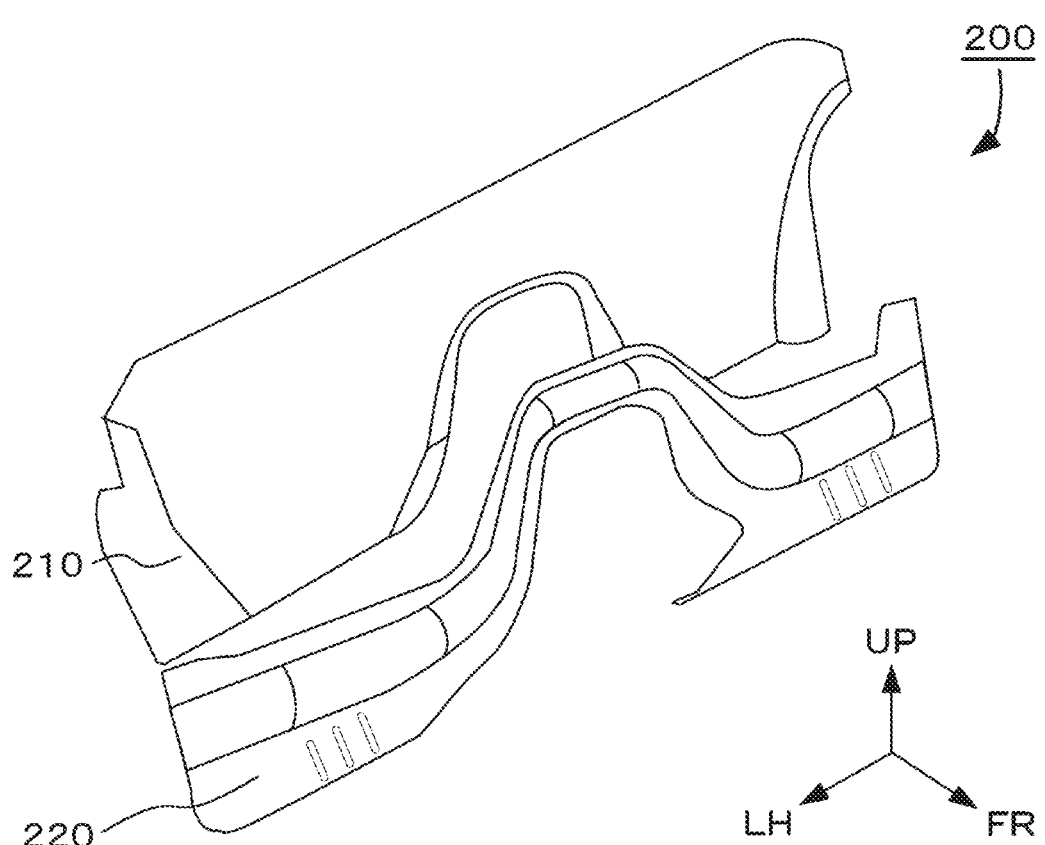
FIG. 3 is an exploded view of a toe board of the vehicle-body front part according to the embodiment of the disclosure.

In one example, as illustrated in FIG. 3, the toe board 200 includes an upper toe board 210 and a lower toe board 220. The upper toe board 210 and the lower toe board 220 are joined to each other by welding or the like with a vehicle lower-side edge of the upper toe board 210 overlapping a vehicle upper-side edge of the lower toe board 220. The upper toe board 210 and the lower toe board 220 are formed of members, such as steel plates having different plate thicknesses, subjected to press molding or the like, and are disposed to extend in the vehicle width direction. Furthermore, the lower toe board 220 is subjected to, for example, hot pressing or the like to have a complicated shape. Additionally, since the toe board 200 is divided into an upper component and a lower component, namely the upper toe board 210 and the lower toe board 220, a size of each component constituting the toe board 200 is reduced.

Figure 4:
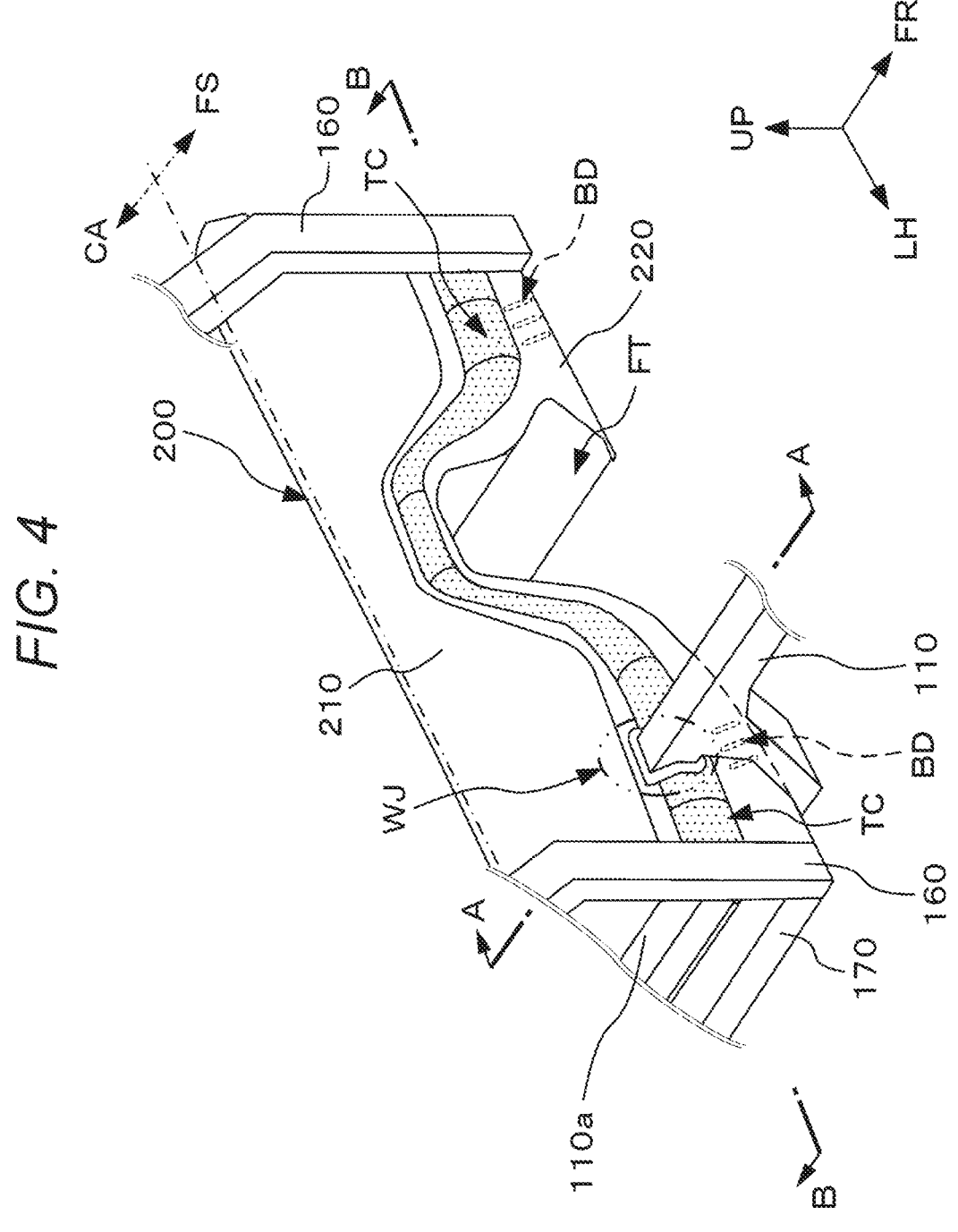
FIG. 4 is a top perspective view of the toe board of the vehicle-body front part and a main frame according to the embodiment of the disclosure.

Additionally, as illustrated in FIG. 4, the toe board 200 has a closed cross section TC (dot hatched area in FIG. 4) at a position where the upper toe board 210 and the lower toe board 220 are overlapped with each other. The closed cross section TC has an area larger than a cross-sectional area of the welding joint WJ between the main frame 110 and the toe board 200, protrudes in the vehicle front-rear direction, and extends toward the vehicle-widthwise opposite sides.

Figure 5:
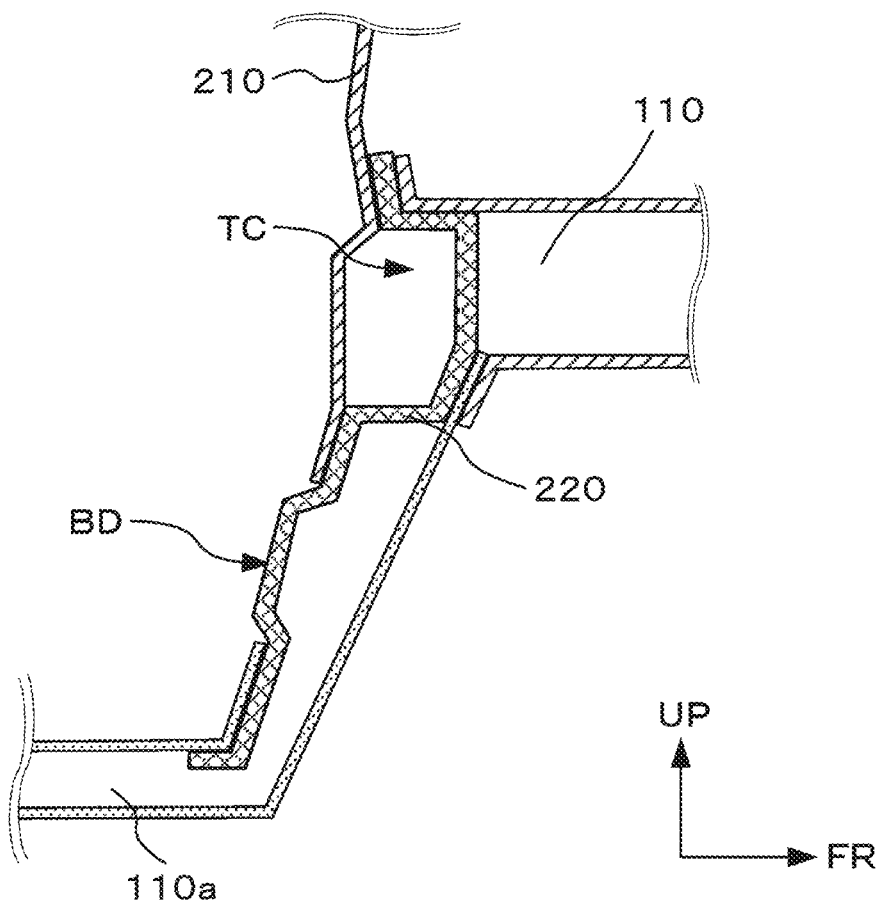
FIG. 5 is an A-directional cross-sectional view of a vehicle up-down directional cross section taken along line A-A illustrated in FIG. 4.

In one example, as illustrated in FIG. 5, the upper toe board 210 is joined to the lower toe board 220 by welding or the like on the vehicle upper surface side of the main frame 110. Additionally, the upper toe board 210 is joined to the lower toe board 220 by welding or the like more on the vehicle lower side than a vehicle lower surface side of the main frame 110. The closed cross section TC is provided by the upper toe board 210 protruding to the vehicle rear side and the lower toe board 220 protruding to the vehicle front side, Additionally, the lower toe board 220 includes beads BD.

Figure 6:
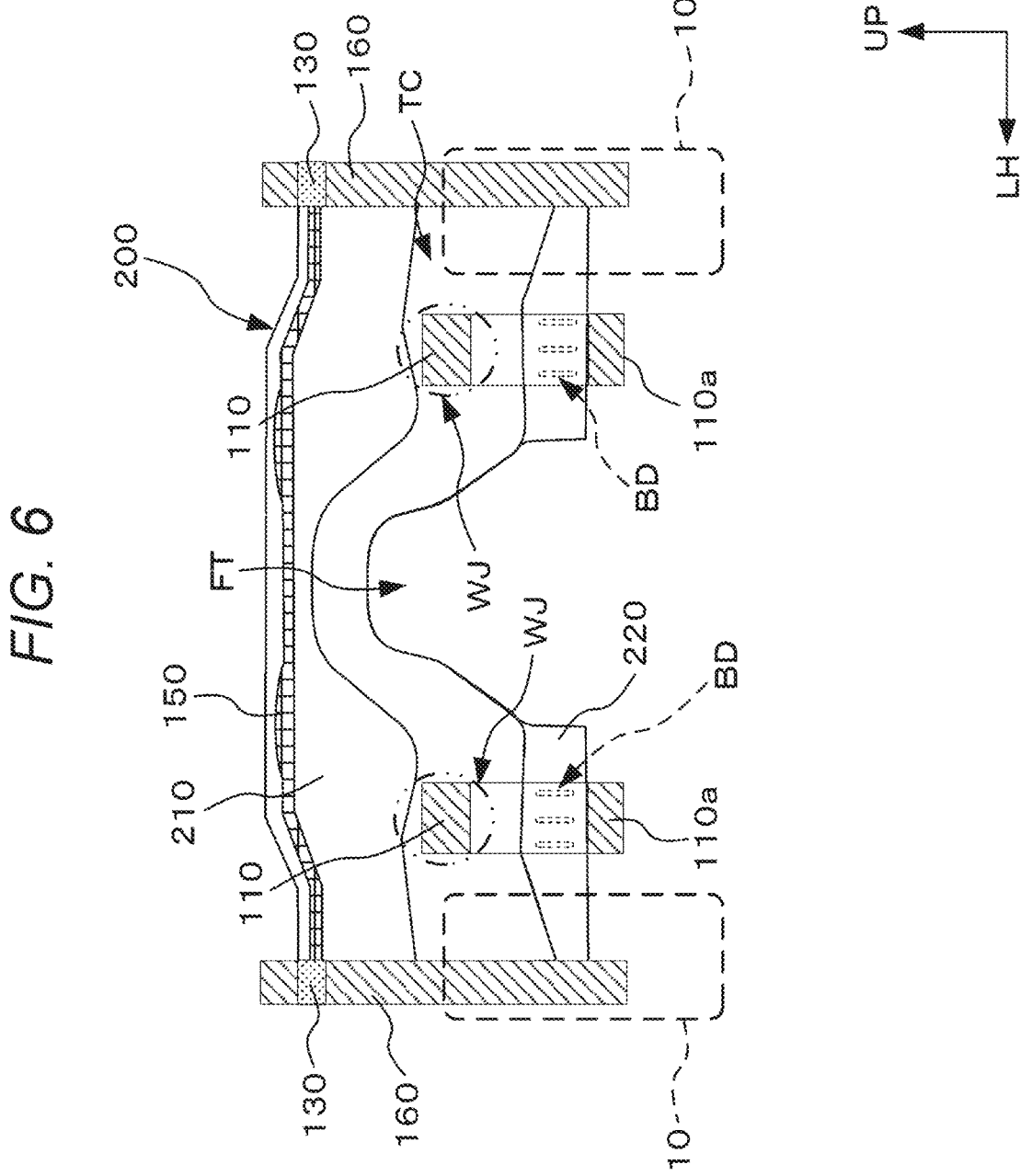
FIG. 6 is a B-directional cross-sectional view of a vehicle up-down directional cross section taken along line B-B illustrated in FIG. 4.

Furthermore, as illustrated in FIG. 6, the main frame 110 is joined to the toe board 200 at the welding joint WJ so as to overlap the closed cross section TC in a vehicle front view. At vehicle-widthwise opposite ends of the closed cross section TC, the front pillars 160 are joined by welding or the like. On the vehicle upper side of the toe board 200, the bulkhead front 150 extends in the vehicle width direction, and is joined to the toe board 200 and the front pillar 160 by welding or the like.

In the toe board 200, a looped framework is formed by the closed cross section TC, the bulkhead front 150 on the vehicle upper side, and the front pillars 160 on the vehicle-widthwise opposite sides.

As described above, in the toe board 200, the upper toe board 210, the lower toe board 220, the closed cross section TC, the bulkhead front 150, and the front pillars 160 form a firm partition wall that is disposed to extend in the vehicle width direction and separates the cabin CA from the vehicle-body front part FS.

Additionally, a floor tunnel FT is formed at a lower area of the vehicle-widthwise central part of the toe board 200. The floor tunnel FT is disposed, in a vehicle bottom part, to have a substantially U shape having a vehicle upper side bulging toward a vehicle interior inner side and having the vehicle lower side opened, and to extend in the vehicle front-rear direction at the vehicle-widthwise central part. A propeller shaft (not illustrated) and the like are accommodated on the vehicle lower side of the floor tunnel FT.

Operation and Effects

Figure 7:
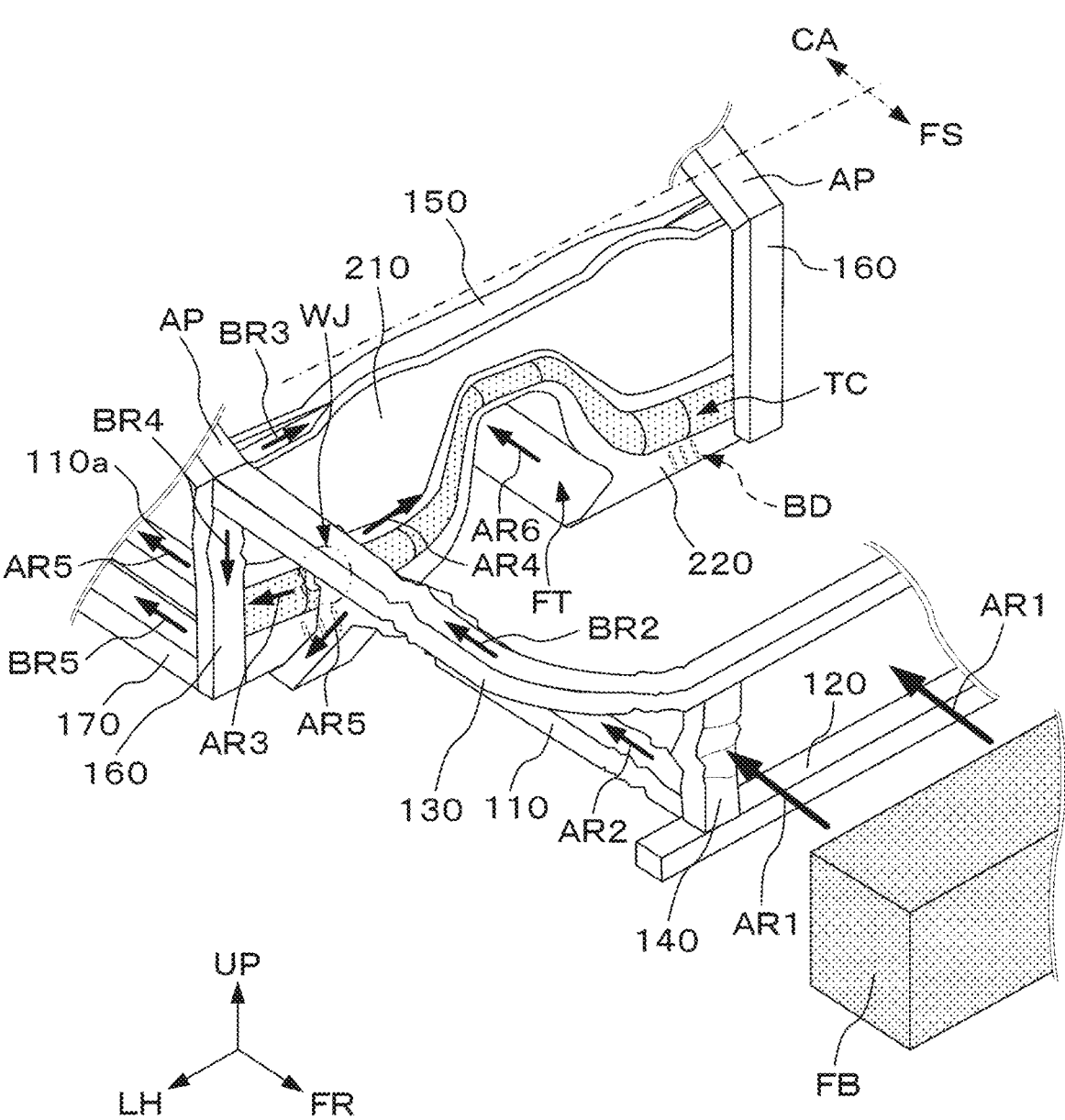
FIG. 7 is a top perspective view of a front frame upon occurrence of a vehicle front-side collision in the vehicle-body front part according to the embodiment of the disclosure.

In the vehicle-body front structure S according to the present embodiment with the above configuration, with reference to FIGS. 5 to 7, a description will be given of an operation of the toe board 200.

Lightweight Structure of Toe Board 200

The toe board 200 is a partition wall that separates the cabin CA from the vehicle-body front part FS, and is provided as a firm framework to prevent the deformation of the cabin CA that is a boarding space for an occupant.

As illustrated in FIG. 5, the toe board 200 includes the upper toe board 210 and the lower toe board 220. The upper toe board 210 and the lower toe board 220 are joined to each other by welding or the like with the vehicle lower-side edge of the upper toe board 210 overlapping the vehicle upper-side edge of the lower toe board 220. The upper toe board 210 and the lower toe board 220 are formed of the members, such as steel plates having different plate thicknesses, subjected to press molding or the like, and are disposed to extend in the vehicle width direction. For example, the lower toe board 220 is formed of a steel plate having a thickness greater than that of the upper toe board 210, and includes the beads BD or the like to increase the rigidity of the lower toe board 220. Furthermore, the lower toe board 220 is subjected to hot pressing or the like to have a complicated shape. For example, the lower toe board 220 has a bracket shape, and other members are directly joined to the toe board 200. Additionally, since the upper toe board 210 and the lower toe board 220 are overlapped with each other, the closed cross section TC is provided by the upper toe board 210 protruding to the vehicle rear side and the lower toe board 220 protruding to the vehicle front side.

Additionally, as illustrated in FIG. 6, the closed cross section TC has the area larger than the cross-sectional area of the welding joint WJ between the main frame 110 and the toe board 200, protrudes in the vehicle front-rear direction, and extends toward the vehicle-widthwise opposite sides. The closed cross section TC is also provided on the vehicle rear side of the front wheel 10. This reduces noise generated when a foreign object splashed by the front wheel 10 hits the toe board 200 during travel of the vehicle V. Furthermore, in order to further reduce noise from the outside of the vehicle and increase bending strength of the toe board 200, the inside of the closed cross section TC may be filled with a foaming agent.

In the toe board 200, the upper toe board 210, the lower toe board 220, the closed cross section TC, the bulkhead front 150, and the front pillars 160 form the firm partition wall that is disposed to extend in the vehicle width direction and has a looped framework. Thus, for example, the toe board 200 may have no frame serving as a framework extending in the vehicle width direction, such as a cross member or a torque box, Upon Occurrence of Vehicle Front-Side Collision In the vehicle-body front structure S according to the present embodiment with the above configuration, upon occurrence of the vehicle front-side collision, as illustrated in FIG. 7, a collision object FB collides in a direction indicated by arrows AR1. At this time, the vehicle-body front structure S allows the collision energy to be absorbed in the vehicle-body front part FS in front of the cabin CA so as to prevent the deformation of the cabin CA that is the boarding space for an occupant. Hereinafter, an operation upon occurrence of the front-side collision will be described. Here, the operation on the left side in a front view of the vehicle V will be described by way of example.

Upon occurrence of the vehicle front-side collision, collision energy is transmitted to the main frame 110 and the upper frame 130 via the bumper beam 120 and a vehicle front edge of the upper frame 130.

The collision energy is transmitted to the main frame 110 in a direction indicated by arrow AR2, and on the vehicle rear side of the main frame 110, the collision energy is transmitted to the toe board 200 joined to the vehicle rear-side end of the main frame 110. In the toe board 200, the upper toe board 210, the lower toe board 220, the closed cross section TC, the bulkhead front 150, and the front pillars 160 form the firm looped framework that is disposed to extend in the vehicle width direction and that separates the cabin CA from the vehicle-body front part FS. Since the main frame 110 is joined to the closed cross section TC having the area larger than the cross-sectional area of the welding joint WJ between the main frame 110 and the toe board 200, the transmitted collision energy is distributed to the frameworks joined to the closed cross section TC via the closed cross section TC as indicated by arrows AR3 and AR4.

Additionally, when the main frame 110 is crushed by collision energy, the collision energy is absorbed in the main frame 110.

Additionally, the collision energy is transmitted to the main frame rear portion 110*a* that is bent toward the vehicle lower side of the toe board 200 and further extends toward the vehicle rear side, and is distributed, as indicated by arrows AR5, to a vehicle rear-side frame (not illustrated) via the main frame rear portion 110*a*. Additionally, as indicated by arrow AR6, the collision energy is distributed to the vehicle rear-side frame via the floor tunnel FT joined to the vehicle lower-side central part of the toe board 200.

The collision energy is transmitted to the upper frame 130 in a direction indicated by arrow BR2, and on the vehicle rear side of the upper frame 130, the collision energy is distributed, as indicated by arrow BR3, to the bulkhead front 150 joined to the vehicle rear-side end of the upper frame 130. Furthermore, as indicated by arrow BR4, the collision energy is distributed to the front pillar 160, and as indicated by arrow BR5, the collision energy is also distributed to the side sill 170. Additionally, when the upper frame 130 is crushed by collision energy, the collision energy is absorbed in the upper frame 130.

As described above, upon occurrence of the vehicle front-side collision, the collision energy is distributed to the firm frameworks that are formed by joining to each other the main frames 110, the bumper beam 120, the upper frame 130, the auxiliary beams 140, the front pillars 160, the bulkhead front 150, and the toe board 200, and the closed cross section TC of the toe board 200 and have a looped and grid shape, and the collision energy is absorbed by means of the deformations of the frameworks.

When the input of the collision energy ends, the collision energy transmission to the main frames 110 and the upper frame 130 ends, and the absorption of the collision energy in the vehicle-body front structure S ends.

As described above, the vehicle-body front structure S according to the present embodiment includes: the toe board 200 interposed between the vehicle-body front part FS and the cabin CA and including the upper toe board 210 disposed on the vehicle upper side and the lower toe board 220 disposed on the vehicle lower side, the upper toe board 210 and the lower toe board 220 being joined to each other with the vehicle lower-side edge of the upper toe board 210 overlapping the vehicle upper-side edge of the lower toe board 220; the main frames 110 provided on the vehicle-widthwise opposite sides of the vehicle-body front part FS and extending in the vehicle front-rear direction; and the front pillars 160 extending in the vehicle up-down direction on vehicle-widthwise opposite outer sides of the toe board 200. The toe board 200 has the closed cross section TC at the position where the upper toe board 210 and the lower toe board 220 are overlapped with each other. The closed cross section TC has the area larger than the cross-sectional area of the welding joint WJ between each of the main frames 110 and the toe board 200, protrudes in the vehicle front-rear direction, and extends toward the vehicle-widthwise opposite sides. The closed cross section TC has the vehicle-widthwise opposite ends joined to the front pillars 160. The main frames 110 are joined to the toe board 200 at positions overlapping the closed cross section TC in a vehicle front view.

That is, in the toe board 200, the upper toe board 210, the lower toe board 220, the closed cross section TC, and the front pillars 160 form the firm partition wall that is disposed to extend in the vehicle width direction, separates the cabin CA from the vehicle-body front part FS, and has the looped framework. Since the main frames 110 are joined to the toe board 200 at the positions overlapping the closed cross section TC provided in the toe board 200, upon occurrence of the vehicle front-side collision, the collision energy from the main frames 110 is efficiently transmitted to the closed cross section TC, and the collision energy is distributed to the vehicle rear part via the front pillars 160 joined to the closed cross section TC. Thus, the rigidity of the vehicle-body front structure S can be kept high.

Additionally, since the toe board 200 is formed in such a manner that the upper toe board 210 and the lower toe board 220 are overlapped with each other, the size of each component constituting the toe board 200 can be reduced. Then, for example, the lower toe board 220 can be subjected to hot pressing and formed as one piece having a complicated shape, and integration of a necessary member into the lower toe board 220 on its surrounding can reduce the number of components constituting the vehicle-body front structure S. Furthermore, since the upper toe board 210 and the lower toe board 220 have different plate thicknesses, it is possible to reduce the weight of the components constituting the vehicle-body front structure S. Furthermore, in the toe board 200, the upper toe board 210, the lower toe board 220, the closed cross section TC, the bulkhead front 150, and the front pillars 160 form the firm partition wall that is disposed to extend in the vehicle width direction and has the looped framework, Thus, for example, since the toe board 200 may have no frame serving as a framework extending in the vehicle width direction, such as a cross member or a torque box, the weight reduction of the vehicle-body front structure S is achieved.

Thus, it is possible to reduce the weight of the vehicle-body front part while maintaining the rigidity of the vehicle-body front part upon occurrence of the vehicle front-side collision.

Although the embodiment of the disclosure has been described in detail with reference to the drawings, the specific configuration is not limited to the embodiment, and encompasses, for example, design variation within a scope not departing from the gist of of the disclosure.

The invention claimed is:

1. A vehicle-body front structure comprising:
   a toe board interposed between a vehicle-body front part and a vehicle interior in a vehicle and comprising an upper toe board disposed on an upper side of the vehicle and a lower toe board disposed on a lower side of the vehicle, the upper toe board and the lower toe board being joined to each other with a vehicle lower-side edge of the upper toe board overlapping a vehicle upper-side edge of the lower toe board;
   main frames provided on opposite sides of the vehicle-body front part in a vehicle width direction of the vehicle and extending in a vehicle front-rear direction of the vehicle; and
   front pillars extending in a vehicle up-down direction of the vehicle on opposite outer sides of the toe board in the vehicle width direction, wherein
   the toe board has a closed cross section at a position where the upper toe board and the lower toe board are overlapped with each other, the closed cross section having an area larger than a cross-sectional area of a welding joint between one of the main frames and the toe board, protruding in the vehicle front-rear direction, and extending toward the opposite sides, the closed cross section comprises opposite ends in the vehicle width direction, the opposite ends being joined to the front pillars, and the main frames are joined to the toe board at positions overlapping the closed cross section in a vehicle front view of the vehicle, further comprising:

a bulkhead front extending in the vehicle width direction on a vehicle upper side of the toe board and joined to the toe board, wherein the closed cross section, the bulkhead front, and the front pillars form a looped framework that extends in the vehicle width direction.

2. The vehicle-body front structure according to claim 1, wherein the bulkhead front has a squared U shape with a vehicle lower side opened.

3. The vehicle-body front structure according to claim 1, wherein the bulkhead front is joined to the toe board and the front pillars.

4. The vehicle-body front structure according to claim 1, wherein the toe board is devoid of a cross member or a torque box extending in the vehicle width direction.

5. The vehicle-body front structure according to claim 1, wherein the closed cross section is provided by the upper toe board protruding to a vehicle rear side and the lower toe board protruding to a vehicle front side.

6. The vehicle-body front structure according to claim 1, wherein the upper toe board and the lower toe board are formed of steel plates having different plate thicknesses.

7. The vehicle-body front structure according to claim 6, wherein the lower toe board is formed of a steel plate having a thickness greater than that of the upper toe board.

8. The vehicle-body front structure according to claim 1, wherein the lower toe board includes beads.

9. The vehicle-body front structure according to claim 1, wherein the lower toe board is formed by hot pressing.

10. The vehicle-body front structure according to claim 1, wherein the main frames each have a rectangular closed cross-sectional shape.

11. The vehicle-body front structure according to claim 1, wherein each of the main frames is bent to a vehicle lower side of the toe board and further extends toward a vehicle rear side, thereby forming a main frame rear portion.

12. The vehicle-body front structure according to claim 1, further comprising a bumper beam extending in the vehicle width direction and joined to vehicle front-side ends of the main frames.

13. The vehicle-body front structure according to claim 1, wherein the toe board is joined to vehicle rear-side ends of the main frames at the welding joint.

14. The vehicle-body front structure according to claim 1, further comprising an upper frame disposed on a vehicle upper side of the vehicle-body front part, the upper frame having a rectangular closed cross-sectional shape and surrounding a periphery of the vehicle-body front part.

15. The vehicle-body front structure according to claim 14, further comprising auxiliary beams extending toward a vehicle lower side and joined to a vehicle front-side part of the upper frame, the auxiliary beams providing joining between a bumper beam and the upper frame.

16. The vehicle-body front structure according to claim 14, further comprising strut towers joined to a vehicle rear-side part of the upper frame and to the main frames, the strut towers providing joining between the upper frame and the main frames.

17. The vehicle-body front structure according to claim 1, further comprising side sills joined to vehicle lower parts of the front pillars on rear sides of the front pillars, each of the side sills being a framework extending in the vehicle front-rear direction and having a rectangular closed cross-sectional shape.

18. The vehicle-body front structure according to claim 1, further comprising a floor tunnel formed at a lower area of a vehicle-widthwise central part of the toe board, the floor tunnel having a U shape with a vehicle upper side bulging toward a vehicle interior inner side and with a vehicle lower side opened, and extending in the vehicle front-rear direction.

19. The vehicle-body front structure according to claim 1, wherein an inside of the closed cross section is filled with a foaming agent.

* * * * *